(12) United States Patent
Gilbert

(10) Patent No.: US 7,570,421 B2
(45) Date of Patent: Aug. 4, 2009

(54) AUTOMATED MICROSCOPE

(75) Inventor: Manfred Gilbert, Schoeffengrund (DE)

(73) Assignee: Leica Microsystems CMS GmbH, Wetzlar (DE)

( * ) Notice: Subject to any disclaimer, the term of this patent is extended or adjusted under 35 U.S.C. 154(b) by 0 days.

(21) Appl. No.: 11/385,087

(22) Filed: Mar. 21, 2006

(65) Prior Publication Data

US 2006/0227413 A1     Oct. 12, 2006

(30) Foreign Application Priority Data

Mar. 22, 2005     (DE) .................. 10 2005 013 152

(51) Int. Cl.
*G02B 21/32* (2006.01)
(52) U.S. Cl. .................... 359/381; 359/384
(58) Field of Classification Search ................ 359/368, 359/381, 384
See application file for complete search history.

(56) References Cited

U.S. PATENT DOCUMENTS

| | | | |
|---|---|---|---|
| 4,878,746 A * | 11/1989 | Nakano et al. ............... | 359/368 |
| 5,000,555 A | 3/1991 | Sato ........................... | 350/530 |
| 6,118,938 A * | 9/2000 | Lawman et al. ............... | 716/16 |
| 6,452,625 B1 | 9/2002 | Kapitza ....................... | 348/80 |
| 6,525,876 B1 | 2/2003 | Gilbert et al. ............... | 359/391 |
| 6,717,725 B2 | 4/2004 | Ganser ....................... | 359/385 |
| 6,804,049 B2 | 10/2004 | Ogino et al. ................ | 359/368 |
| 2003/0090789 A1 | 5/2003 | Herz et al. ................... | 359/368 |
| 2003/0161036 A1 | 8/2003 | Gonschor .................... | 359/368 |
| 2004/0190129 A1 | 9/2004 | Peter et al. .................. | 359/368 |
| 2005/0063052 A1 * | 3/2005 | Yamaguchi .................. | 359/386 |
| 2006/0012315 A1 * | 1/2006 | McDonough et al. ........ | 315/291 |

FOREIGN PATENT DOCUMENTS

| | | |
|---|---|---|
| DE | 42 31 379 A1 | 3/1994 |
| DE | 298 04 776 U1 | 7/1998 |
| DE | 101 06 275 A1 | 4/2002 |
| DE | 101 54 271 | 9/2002 |
| DE | 103 05 117 | 8/2004 |
| DE | 10 2004 034848 A1 | 5/2006 |
| WO | WO-2005/062104 A | 7/2005 |

OTHER PUBLICATIONS

English Patent Abstract of JP 10 333017 A published Dec. 18, 1998.
European Search Report for EP 06 10 0927 published May 31, 2006.

* cited by examiner

*Primary Examiner*—Joshua L Pritchett
(74) *Attorney, Agent, or Firm*—Darby & Darby

(57) ABSTRACT

An automated microscope includes a stand and a front control panel. The front control panel is disposed on the stand and including a first and a second button. Third and a fourth buttons are associated with the microscope.

22 Claims, 6 Drawing Sheets

AUTOMATED MICROSCOPE

Priority is claimed to German patent application DE 10 2005 013 152.2, filed Mar. 22, 2005, the entire subject matter of which is hereby incorporated by reference herein.

The invention relates to an automated microscope. The invention relates in particular to an automated microscope having a stand.

BACKGROUND

U.S. Patent Application Pub. 2004/0190129 describes an apparatus and a method for controlling a microscope system. The microscope encompasses a stand that has an integrated central display. The display encompasses a menu for operating the microscope. Arranged around the actuation knob for focusing are several buttons that control at least one microscope function.

U.S. Patent Application Pub. 2003/0161036 describes a motorized microscope that encompasses a plurality of electrically controllable microscope components. The actuation of buttons then switches the corresponding microscope components into the beam path.

U.S. Patent Application Pub. 2003/0090789 describes a microscope having a plurality of control elements. The microscope encompasses a plurality of electronically controllable components. Because the number of components exceeds the number of control elements (buttons) on the microscope, corresponding microscope functions can be allocated to the buttons.

U.S. Pat. No. 6,171,725 describes an automated microscope system. Provided next to the microscope is a box in which is provided a control and monitoring device from which energy is supplied to the microscope.

U.S. Pat. No. 6,525,876 describes an apparatus for changing the objectives of a microscope. The objectives are provided on a motorized turret, so that objective changing proceeds in automatic and motorized fashion.

U.S. Pat. No. 6,452,625 describes a compact video microscope. For communication and in order to control the microscope, the microscope is equipped with a microphone, a loudspeaker, and a video camera.

U.S. Pat. No. 5,000,555 describes a microscope having a stand and a focusing knob provided on the stand, several buttons being provided in the region around the focusing knob. The buttons serve to input commands to a circuit provided in the microscope. A distribution and functionality of the buttons according to the invention are not disclosed here.

SUMMARY OF THE INVENTION

It is an object of the present invention to provide an automated microscope which makes it easier for the user to position objectives in the working position of the microscope.

The present invention provides an automated microscope having a stand. A front control panel that possesses a plurality of buttons is provided on the stand. At least two further buttons are associated with the microscope.

Associated with each of the buttons is an indicator indicating the objective magnification that is associated with the respective button. The indicator can be an adhesive plate. The indicator can likewise be an electronic display.

The further buttons can be provided on the left or the right side of the stand. It is likewise conceivable for further buttons to be provided on the left and the right side of the stand. The buttons can also be implemented as a left footswitch and a right footswitch of a double footswitch. The footswitch and the buttons on the microscope stand can also be associated in shared fashion with the microscope.

In standard mode, the objective magnifications can be traveled to in succession by way of the footswitches or the buttons on the side of the stand. A pressing of the upper button or an actuation of the right footswitch has an identical function. Pressing the lower button on the stand or actuating the left footswitch likewise has an identical function. The identical function is a motorized clockwise or counterclockwise rotation of the objective turret.

A toggle mode can be activated by actuating the toggle button. The standard mode can be activated by actuating the toggle button again, the objectives programmed for the toggle mode being retained.

Pressing and holding the toggle button activates the programming mode. While the toggle button is held down, two magnifications can be selected by pressing the objective-magnification buttons. The buttons selected in programming mode light up in the same color, toggle mode being activated when the toggle button is released. The buttons are equipped with at least one light-emitting means. An activated button emits green light, and a non-activated button emits yellow light.

BRIEF DESCRIPTION OF THE DRAWINGS

The present invention is elaborated upon below based on exemplary embodiments with reference to the schematic drawings.

DETAILED DESCRIPTION

Figure 1:
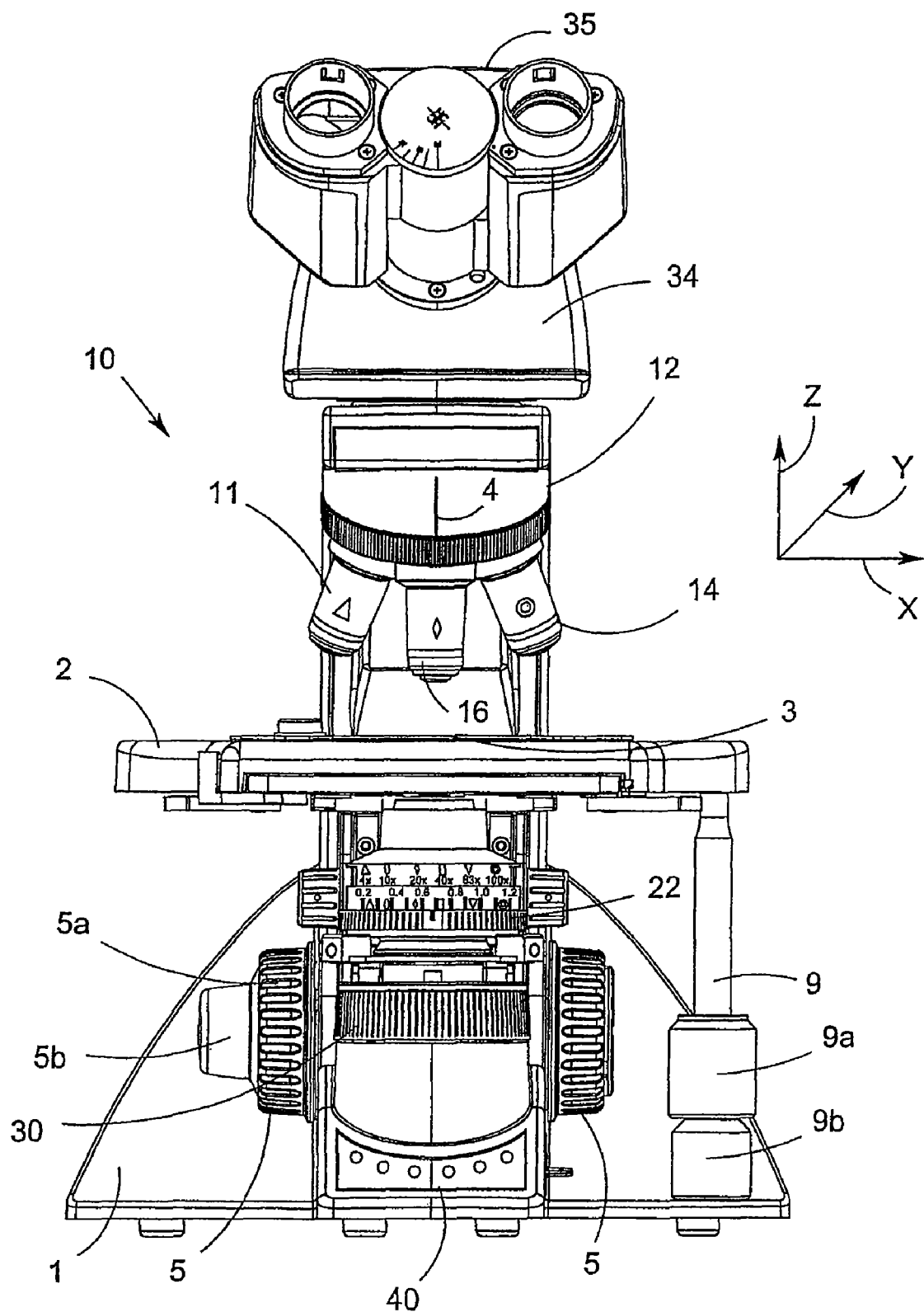
FIG. 1 is a front view of a microscope that encompasses buttons for actuating the microscope functions.

FIG. 1 is a front view of microscope 10 in which an exemplifying embodiment of the teaching according to the present invention is realized. Microscope 10 encompasses a stand 1 on which a microscope stage 2 is mounted. A condenser 30 is provided beneath microscope stage 2. Opposite condenser 30, a turret 12 is mounted on stand 1. Turret 12 carries several objectives 11, 14, 16 that, upon initiation by the user, can be introduced in motorized fashion into a working position 4. The working position is that position of an objective 11, 14, 16 in which a user performs a microscopic examination of a specimen 3 located on microscope stage 2. In the setting shown in FIG. 1, objective 16 is in the working position.

Microscope stage 2 is equipped with a displacement element 9 with which microscope stage 2 can be shifted in an X direction and a Y direction. Displacement element 9 possesses, for that purpose, an X displacement element 9a and a Y displacement element 9b. Microscope 10 likewise encompasses a displacement device 5 for the Z direction, with which microscope stage 2 is moved in the Z direction. The displacement device encompasses at least one first and one second actuation element 5a and 5b, each of which encompasses a fine and a coarse focus.

Condenser 30 is equipped with at least one displaceable diaphragm setting ring 22. Condenser 30 can likewise be motorized, so that the setting of the diaphragm on condenser 30 matches the selected magnification of the objective. Microscope 10 furthermore carries a tube 34 that is equipped with a binocular eyepiece 35 through which the image of the specimen can be viewed. A front control panel 40, which carries a plurality of buttons (see FIG. 4) for selecting an objective magnification, is provided on the stand.

Figure 2:
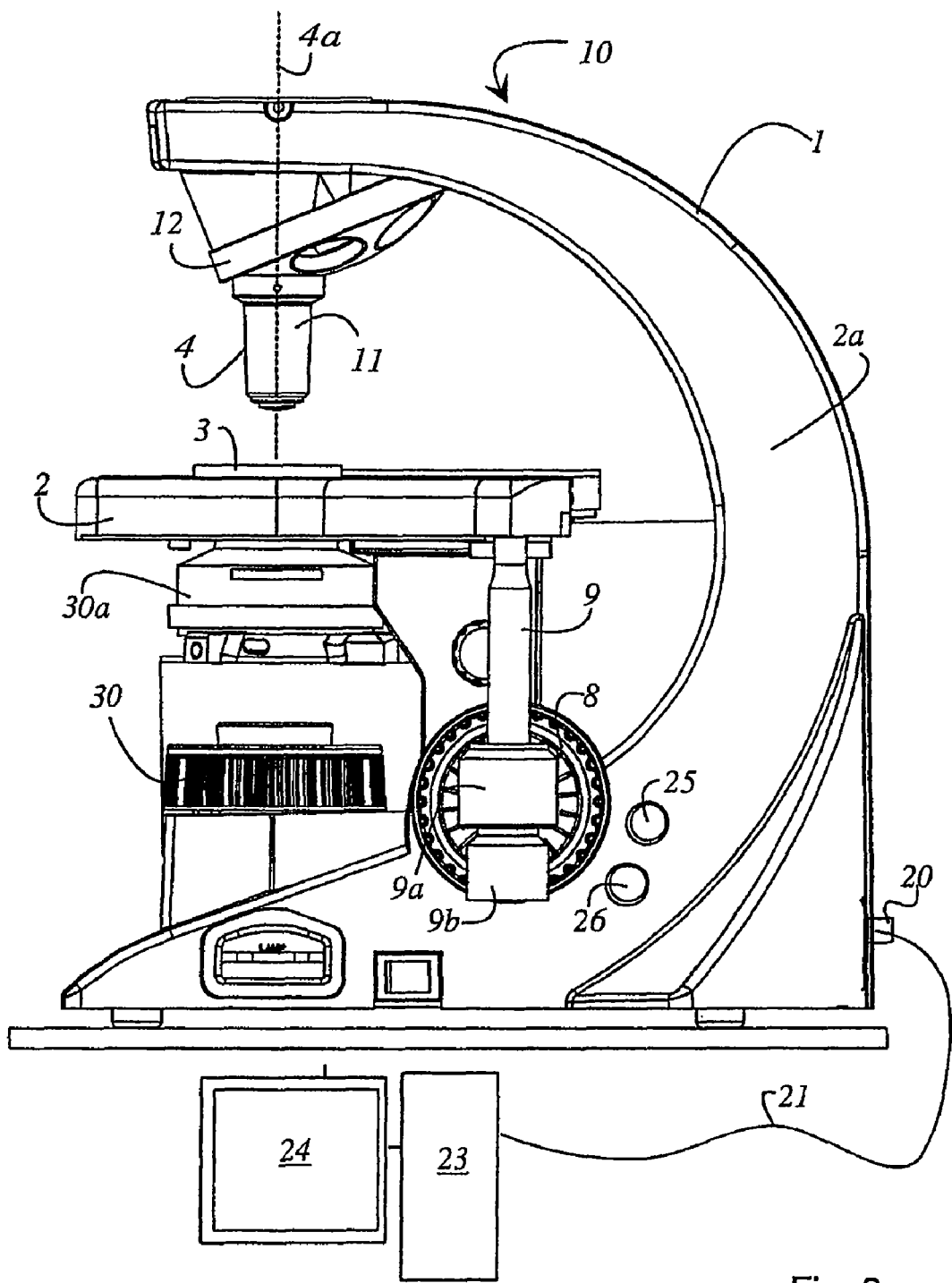
FIG. 2 is a side view of the microscope with further buttons that are arranged on the side of the stand.

FIG. 2 is a side view of microscope 10 with further buttons 25 and 26 that are arranged on side 2a of stand 1. Buttons 25 and 26 can also be mounted on both sides of stand 1. Upper button 25 and lower button 26 are arranged around a drive element 8. With a motorized condenser 30, condenser head 30a is automatically swung out at objective magnifications of less than 10×. Condenser head 30a is swung in at objective magnifications equal to or greater than 10×. Also depicted in FIG. 2 is a further embodiment of stand 1. In this embodiment, stand 1 encompasses a USB interface 20 that is connected via a data cable 21 to a PC 23. All the microscope functions are thus controllable via PC 23. Consequently, buttons 25, 26, 41, 42, 43, 44, 45, 46, 47 provided on the stand can also be assigned in the desired fashion from PC 23. A display 24 associated with PC 23 provides graphical assistance for button assignment. For example, the buttons provided on stand 1 are depicted on display 24 and the user must then, for example using an input element, select the button to be assigned.

Figure 3:
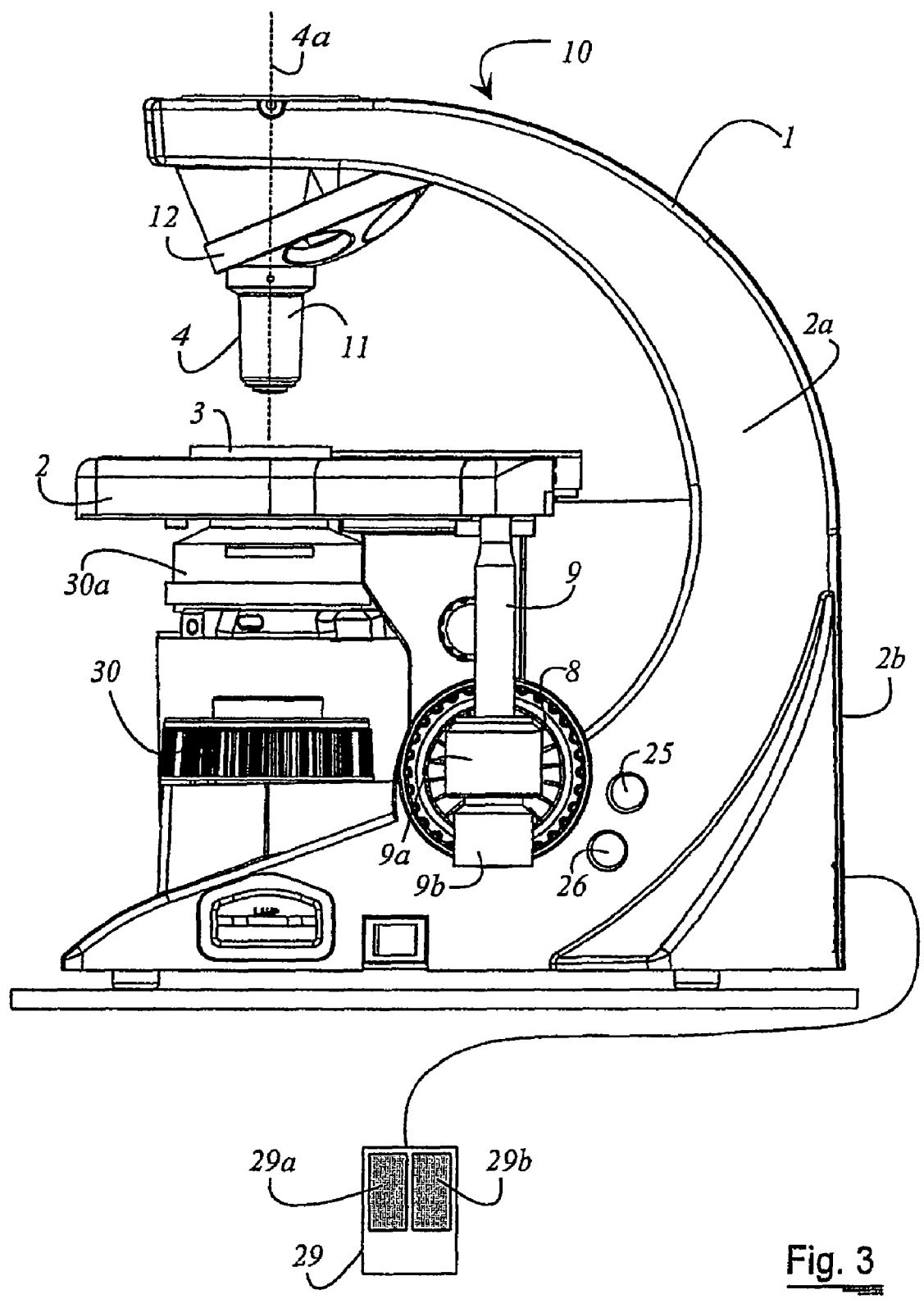
FIG. 3 is a side view of the microscope with a footswitch for actuating a defined microscope function.

FIG. 3 is a side view of microscope 10 with a double footswitch 29 for actuating a defined microscope function. The function of upper button 25 can also be implemented using a right footswitch 29a, and the function of lower button 26 can also be implemented using a left footswitch 29b of double footswitch 29. The connector for double footswitch 29 can be located on a back side 2b of stand 1.

Figure 4:
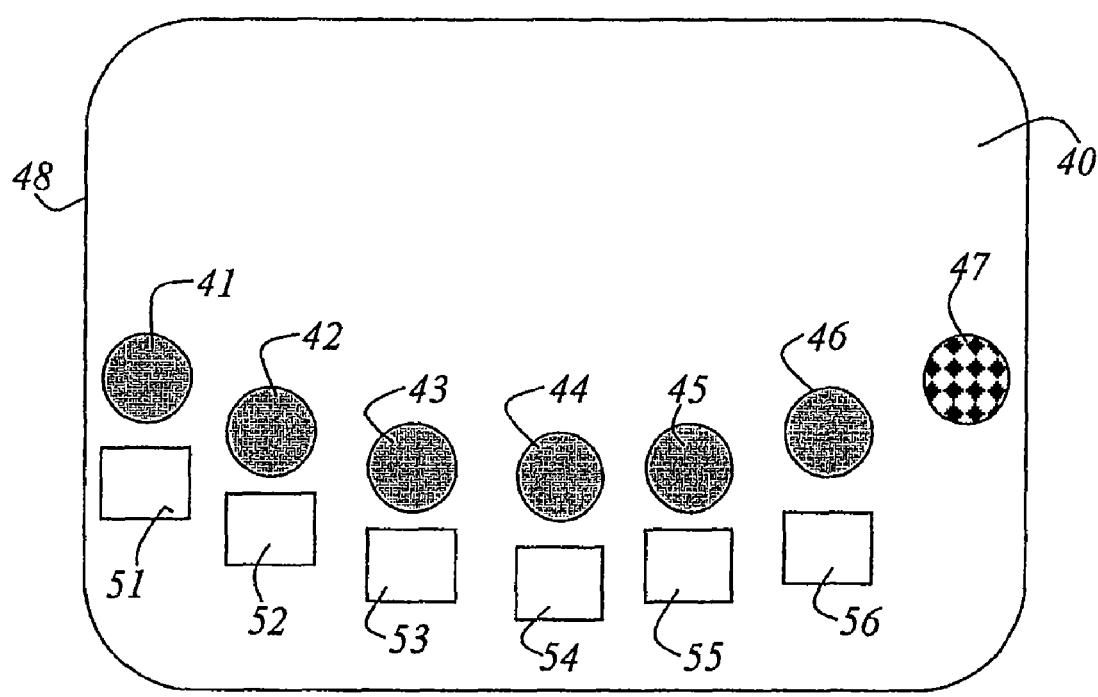
FIG. 4 is a detail view of the front control panel with a plurality of buttons for selecting an objective magnification.

FIG. 4 is a detail view of front control panel 40 with a plurality of buttons 41, 42, 43, 44, 45, 46, 47 for selecting an objective magnification. In the embodiment depicted here, six buttons 41, 42, 43, 44, 45, 46 are provided for direct selection of an objective. The user can be informed, via corresponding indicators 51, 52, 53, 54, 55, 56, of the allocation of the individual buttons 41, 42, 43, 44, 45, 46 to the objectives. Indicators 51, 52, 53, 54, 55, or 56 show the magnification that will be moved in motorized fashion into the working position of microscope 10 by way of the respective button 41, 42, 43, 44, 45, or 46. Indicator 51, 52, 53, 54, 55, or 56 can be configured, for example, as an electronic display or as an adhesive plate. The assignments of the individual buttons 41, 42, 43, 44, 45, 46 are generally selected in such a way that the objective having the lowest magnification can be swung into the working position using first button 41. Button 41 for the lowest magnification is thus located at left edge 48 of front control panel 40. The allocation of buttons 41, 42, 43, 44, 45, 46 to the respective objectives is made at the factory or can also be carried out by the user, and is independent of the microscope's equipment. Button 47, which serves as a toggle button, is provided at right edge 49 of front control panel 40. The toggle button serves to switch over the mode of front control panel 40. In standard mode, the two buttons 25 and 26 on the right or left side 2a of stand 1 are used to move to the object magnifications sequentially. Pressing upper button 25 causes a motorized clockwise rotation of objective turret 12. Pressing lower button 26 causes a counterclockwise motorized rotation of objective turret 12. In the standard configuration, the assignment of buttons 25 and 26 on the right and left sides 2a of stand 1 is identical. When toggle mode is selected, pressing side buttons 25 and 26 then switches back and forth between two previously programmed magnifications. In programming mode, the objectives predefined at the factory can easily be modified in user-specific fashion. In front control panel 40, colored diodes or lamps are integrated into buttons 41, 42, 43, 44, 45, 46, 47, and indicate the objective located in the working position or the current mode.

Figure 5:
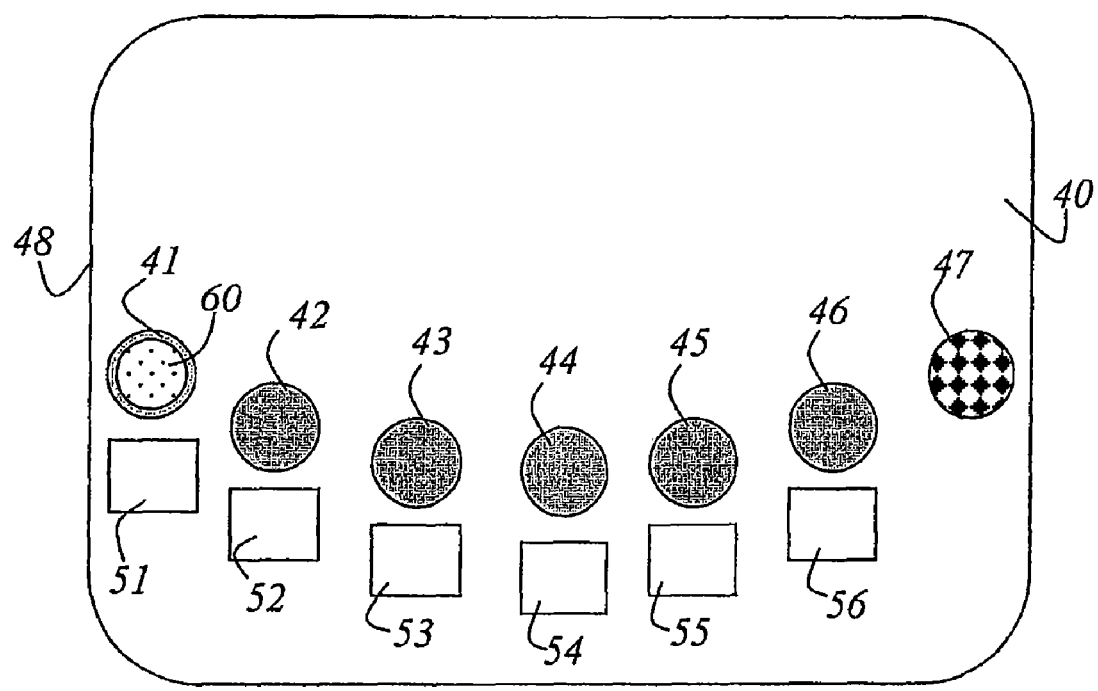
FIG. 5 is a detail view of the front control panel in standard operating mode.

FIG. 5 is a detail view of front control panel 40 in standard operating mode. Button 47 (toggle button) is off. Either the toggle button is not energized or the diode is not lit, thus indicating non-functioning of button 47. Button 41 for the current objective is lit, since the diode or lamp 60 incorporated thereinto is activated. Using buttons 25 and 26 on the side of stand 1, the objectives can be swung in succession into the working position. For example, if one of buttons 25 and 26 on the side of stand 1 is pressed twice in succession, an objective will be skipped and the next objective will be swung directly into the working position. The button associated with that objective then lights up. The diode or lamp 60 provided in the button is activated. In a preferred embodiment, the diodes provided in buttons 41, 42, 43, 44, 45, 46 emit green light.

Figure 6:
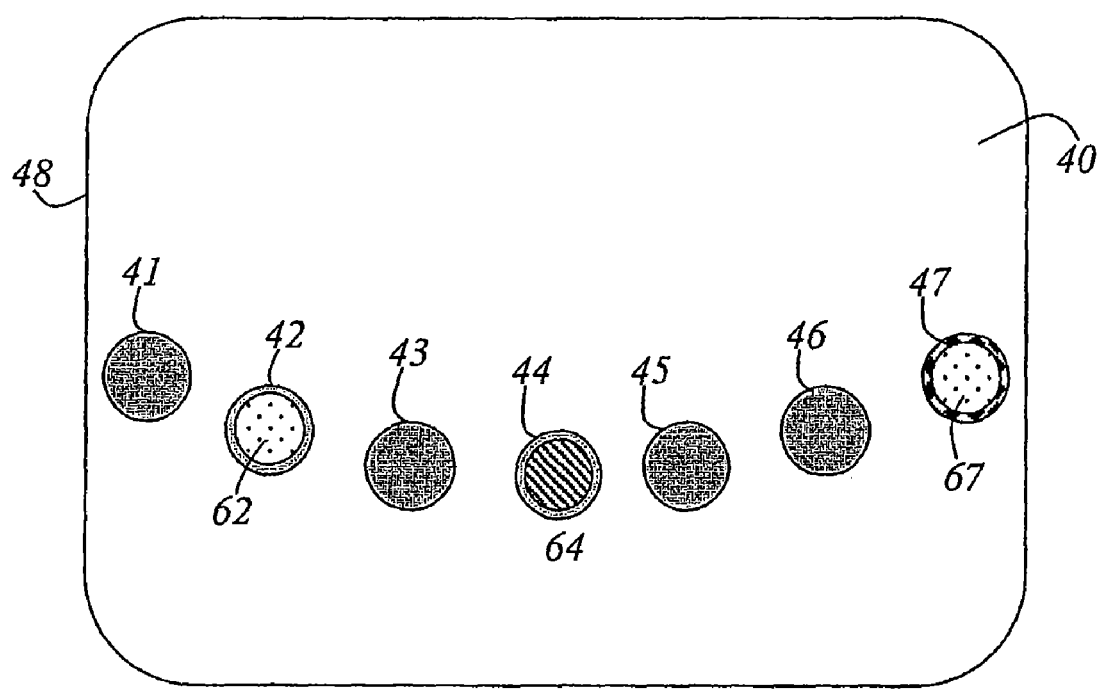
FIG. 6 is a detail view of the front control panel in toggle mode.

FIG. 6 is a detail view of front control panel 40 in toggle mode. Proceeding from standard mode (FIG. 5), briefly pressing on button 47 (toggle button) causes a switchover to toggle mode. The diode or lamp 67 provided in button 47 is correspondingly activated. This diode 67 preferably likewise emits green light. The lower of the previously programmed magnifications is set, and the associated button 42 lights up. The diode or lamp 62 preferably emits green light. Button 44 for the second programmed objective lights up in a different color from button 44. The diode or lamp 64 preferably emits yellow light. Using the two buttons 25 and 26 on the right or left side of stand 1, it is possible to switch back and forth between these two objectives. It is immaterial which of the side buttons 25 or 26 is pressed. As the objective is changed, the color indicator also changes, so that the button for the current objective always emits green and that of the other objective emits yellow. Pressing button 47 (toggle button) again switches back into the standard mode. A changeover to standard mode also occurs when one of buttons 41, 42, 43, 44, 45, 46 is pressed. The objective selected by the user is moved into the working position, and the objectives programmed for toggle mode are retained.

Figure 7:
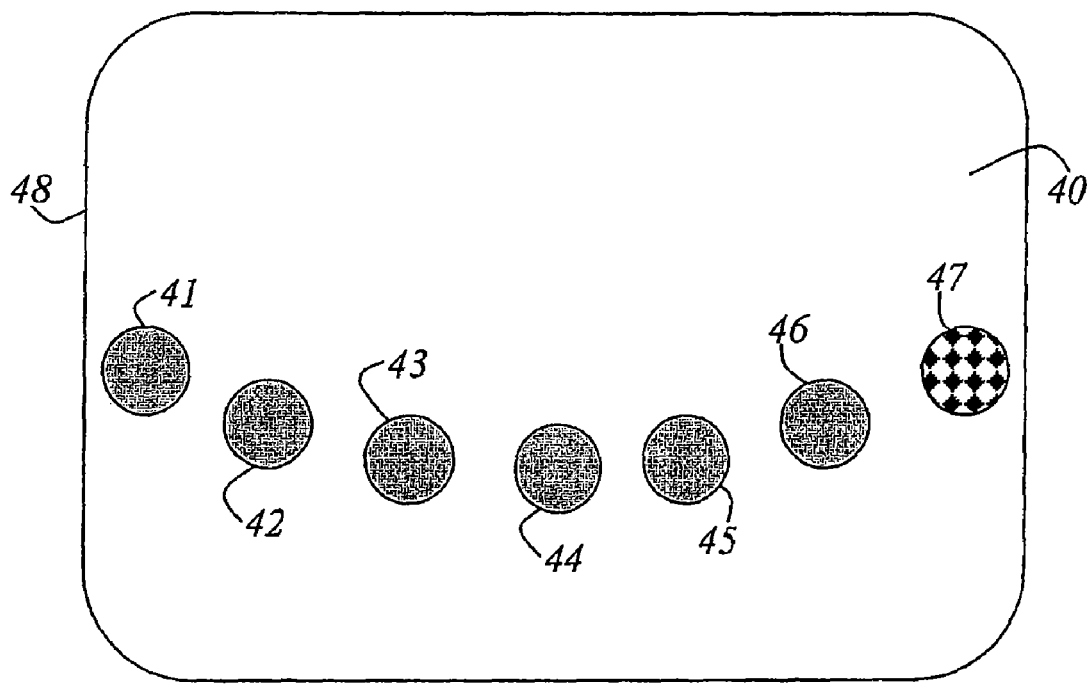
FIG. 7 is a detail view of the front control panel in programming mode.

FIG. 7 is a detail view of front control panel 40 in programming mode. When the user presses and holds button 47 (toggle button), all the previously illuminated buttons go out. The objectives desired for the toggle mode must be selected, by pressing, while button 47 (toggle button) is pressed.

Figure 8:
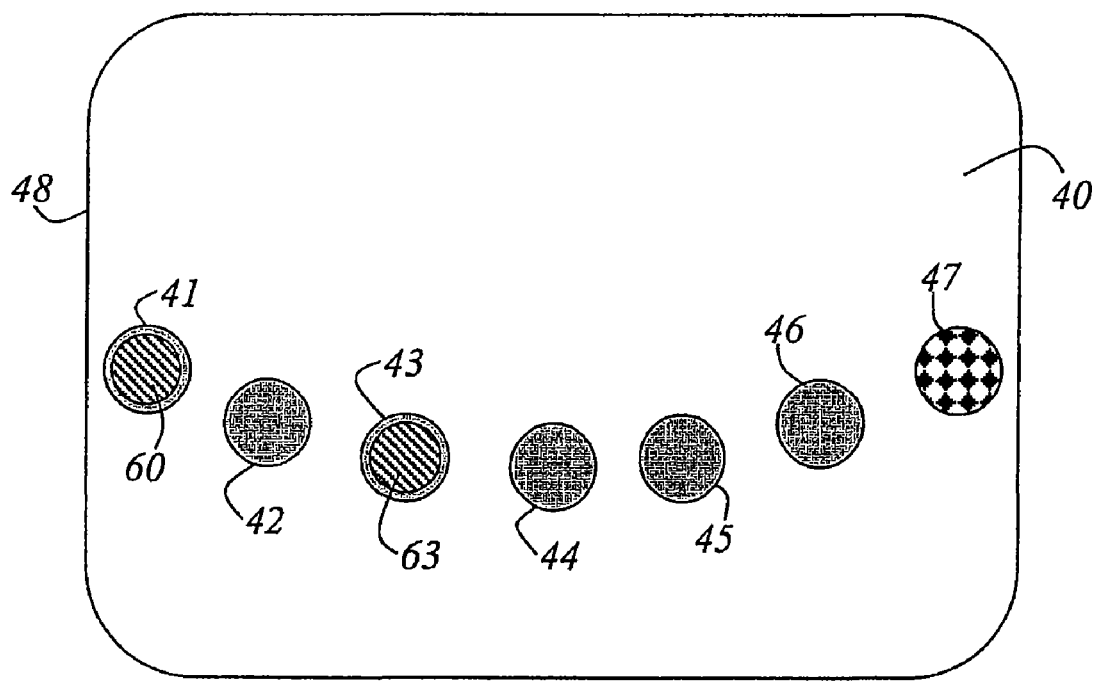
FIG. 8 is a detail view of the front control panel in programming mode for the toggle mode for switching between two defined objective magnifications.

FIG. 8 is a detail view of front control panel 40 in the programming mode for the toggle mode for switching between two defined objective magnifications. Buttons 41 and 43 selected in programming mode now light up in the same color. Lamps 60 and 63 provided in buttons 41 and 43 emit light of the same color. In the preferred embodiment, the diodes or lamps 60 and 63 associated with buttons 41 and 43 emit yellow light. When button 47 (toggle button) is then released, toggle mode is activated.

Figure 9:
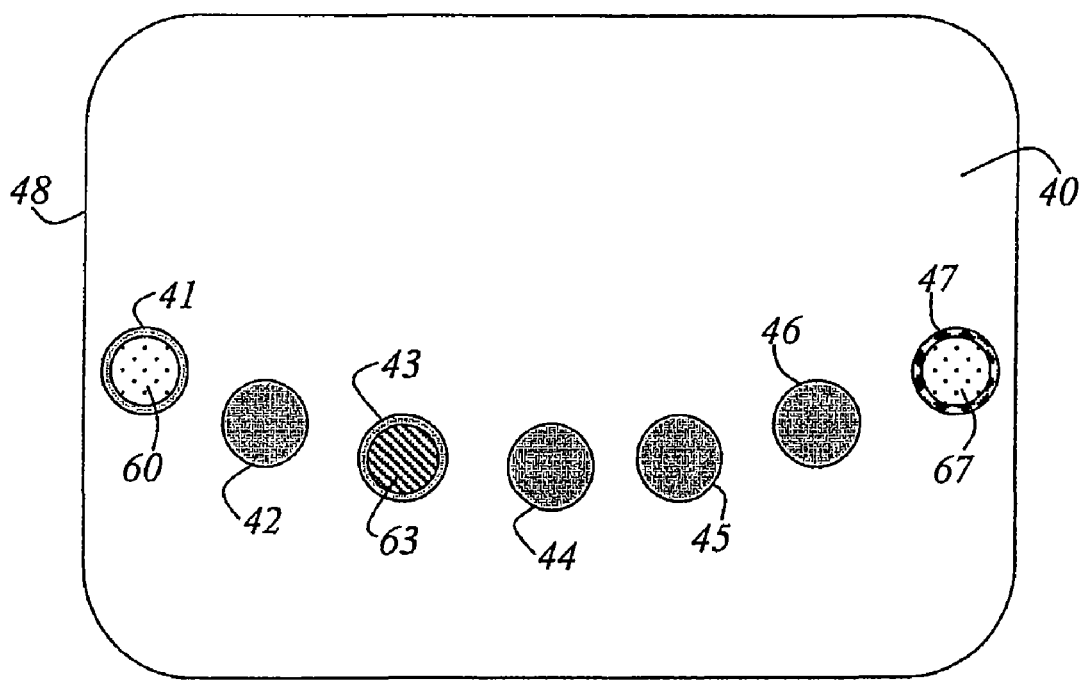
FIG. 9 is a detail view of the front control panel, programming mode having been terminated.

FIG. 9 is a detail view of front control panel 40 in which programming mode has been terminated. After button 47 (toggle button) is released, button 41 for the objective having the lower magnification lights up in green. The objective having the lower magnification is also moved in. Button 43, for the additional objective used in toggle mode, lights up in yellow. These settings are retained until programming mode is once again selected and activated.

As already described in FIG. 3, the objectives can also, optionally, be swung in using a double footswitch that is connected to stand 1. The connector for double footswitch 29 can be located on the back side of stand 1. Left footswitch 29a has the same function as lower button 26 on stand 1. Right footswitch 29b has the same function as upper button 25 on stand 1.

Special functions for side buttons 25 and 26 are also possible. With a motorized condenser 30, condenser head 30a is automatically swung out at objective magnifications of less than 10×. Condenser head 30a is swung in at objective magnifications greater than or equal to 10×. For special applications, the swinging of the condenser head in or out can be assigned to the right or left buttons 25 and 26 of stand 1, so that the position of the condenser head can be adjusted by the user. A change in the assignment of the buttons is possible only using the Leica DMControl software program and requires connection to a PC.

What is claimed is:

1. An automated microscope comprising:
    a stand:
    a plurality of objectives disposed in a turret;
    a front control panel disposed on the stand and including a plurality of buttons, each button being associated with a respective objective of the plurality of objectives and usable for moving the respective objective to a working position in a motorized manner;
    a first switch-over button and a second switch-over button, the first and second switch-over buttons being associated with the microscope, the first switch-over button, in a standard mode, being configured to sequentially rotate the turret clockwise, the second switch-over button, in the standard mode, being configured to sequentially rotate the turret counterclockwise, the first switch-over button being programmably associatable with a first selectable magnification of a first objective of the plurality of objectives for a toggle mode, and the second switch-over button being programmably associatable with a second selectable magnification of a second objective of the plurality of objectives for the toggle mode; and
    a toggle button configured to activate and deactivate the toggle mode,
    wherein, in the toggle mode, the first switch-over button is configured to select the first selectable magnification corresponding to the first objective and the second switch-over button is configured to select the second selectable magnification corresponding to the second objective.

2. The automated microscope as recited in claim 1 further comprising:
    an indicator associated with each of the plurality of buttons and configured to indicate the respective magnification.

3. The automated microscope as recited in claim 2 wherein at least one of the indicators includes an adhesive plate.

4. The automated microscope as recited in claim 2 wherein at least one of the indicators includes an electronic display.

5. The automated microscope as recited in claim 1 wherein the first and second switch-over buttons are disposed on a left side or a right side of the stand.

6. The automated microscope as recited in claim 1 wherein the first and second switch-over buttons are disposed on a left side of the stand, and further comprising third and fourth switch-over buttons disposed on a right side of the stand and corresponding respectively to the first and second switch-over buttons.

7. The automated microscope as recited in claim 1 further comprising:
    a left footswitch configured to implement a function of the third button; and
    a right footswitch configured to implement a function of the fourth button.

8. The automated microscope as recited in claim 1 further comprising a double footswitch including a left and a right footswitch, the left footswitch being configured to implement a function of the third button and the right footswitch being configured to implement a function of a fourth button.

9. The automated microscope as recited in claim 1 further comprising:
    a left footswitch having a same first function as a function of the third button; and
    a right footswitch having a same second function as a function of the fourth button.

10. The automated microscope as recited in claim 9 wherein the first function includes a motorized clockwise rotation of an objective turret of the automated microscope.

11. The automated microscope as recited in claim 9 wherein the second function includes a motorized counterclockwise rotation of an objective turret of the automated microscope.

12. The automated microscope as recited in claim 1 wherein the toggle button is usable, by a second actuation thereof, to select the standard mode so as to retain, for the toggle mode, the programming of the first and second switch-over buttons.

13. The automated microscope as recited in claim 12 wherein the toggle button is configured, by an extended pressing thereof, to activate a programming mode for programming the first and second switch-over buttons.

14. The automated microscope as recited in claim 13 wherein:
    first and second buttons of the plurality of buttons are configured to light a same color when selected in the programming mode; and
    the first button is configured, when released, to activate a toggle mode.

15. The automated microscope as recited in claim 1 wherein the first button includes a first light-emitting device configured to light up only when the first button is actuated, and the second button includes a second light-emitting device configured to light up only when the second button is actuated.

16. The automated microscope as recited in claim 15 wherein the first light-emitting device is configured to emit green light when the first button is actuated, and the second light-emitting device is configured to emit green light when the second button is actuated.

17. The automated microscope as recited in claim 1 wherein the first button includes a first light-emitting device configured to emit yellow light when the first button is not actuated, and the second button includes a second light-emitting device configured to emit yellow light when the second button is not actuated.

18. The automated microscope as recited in claim 17 wherein the first light-emitting device configured to emit green light when the first button is actuated, and the second light-emitting device configured to emit green light when the second button is actuated.

19. The automated microscope as recited in claim 15 wherein the first and second light-emitting devices each including a respective diode.

20. The automated microscope as recited in claim 1 wherein:
- the stand includes a USB interface; and
- the plurality of buttons, the first switch-over button, and the second switch-over button are selectively assignable from a personal computer.

21. The automated microscope as recited in claim 1 wherein the first and second switch-over buttons are programmable by a pressing of first and second buttons of the plurality of buttons during a holding down of the toggle button.

22. An automated microscope having a standard mode and a toggle mode, the automated microscope comprising:
- a stand:
- a plurality of objectives disposed in a turret;
- a front control panel disposed on the stand and including a plurality of objective buttons, each objective button being associated with a respective objective of the plurality of objectives and usable for moving the respective objective to a working position in a motorized manner;
- a first switch-over button and a second switch-over button, the first and second switch-over buttons being associated with the microscope, the first switch-over button being configured to sequentially rotate the turret clockwise in the standard mode and being programmably associatable with a first objective of the plurality of objectives in the toggle mode, the second switch-over button being configured to sequentially rotate the turret counterclockwise in the standard mode and being programmably associatable with a second objective of the plurality of objectives in the toggle mode;
- wherein, in the standard mode, the first and second switch-over buttons are configured to respectively sequentially rotate the turret clockwise and counterclockwise and, in the toggle mode, the first and second buttons are configured to respectively select the first and second objectives.

* * * * *

UNITED STATES PATENT AND TRADEMARK OFFICE
CERTIFICATE OF CORRECTION

PATENT NO.         : 7,570,421 B2
APPLICATION NO. : 11/385087
DATED              : August 4, 2009
INVENTOR(S)        : Manfred Gilbert It is certified that error appears in the above-identified patent and that said Letters Patent is hereby corrected as shown below:

In the face of the patent, under Foreign Application Priority Data:

Please delete "10 2005 013 152" and insert --10 2005 013 152.2-- therefor.

Signed and Sealed this

Third Day of November, 2009

David J. Kappos
*Director of the United States Patent and Trademark Office*